United States Patent
Park

(10) Patent No.: US 9,863,597 B2
(45) Date of Patent: Jan. 9, 2018

(54) LIGHTING DEVICE FOR VEHICLE

(71) Applicant: LG Electronics Inc., Seoul (KR)

(72) Inventor: Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/623,126

(22) Filed: Jun. 14, 2017

(65) Prior Publication Data
US 2017/0356618 A1  Dec. 14, 2017

(30) Foreign Application Priority Data

Jun. 14, 2016 (KR) ........................ 10-2016-0074107

(51) Int. Cl.
*F21S 8/10* (2006.01)
*B60Q 11/00* (2006.01)
*F21K 9/64* (2016.01)
*F21Y 115/30* (2016.01)

(52) U.S. Cl.
CPC ............ *F21S 48/1317* (2013.01); *F21K 9/64* (2016.08); *F21S 48/1145* (2013.01); *F21S 48/1225* (2013.01); *F21S 48/145* (2013.01); *F21S 48/328* (2013.01); *F21Y 2115/30* (2016.08)

(58) Field of Classification Search
CPC ............... F21S 48/1317; F21S 48/1145; F21S 48/1225; F21S 48/145; F21S 48/328; F21K 9/64; F21Y 2115/30
USPC ........................................................ 250/205
See application file for complete search history.

(56) References Cited

U.S. PATENT DOCUMENTS 7,500,773 B2 * 3/2009 Komatsu .............. F21S 48/1159
362/539
8,552,648 B2 * 10/2013 Hayakawa ............. B60Q 1/143
315/80

FOREIGN PATENT DOCUMENTS

| JP | 2004085725 | 3/2004 |
| JP | 2014178464 | 9/2014 |
| JP | 2015064963 | 4/2015 |
| KR | 1020110022720 | 3/2011 |

OTHER PUBLICATIONS

Korean Notice of Allowance in Korean Application No. 10-2016-0074107, dated Apr. 19, 2017, 9 pages (with English translation).

* cited by examiner

*Primary Examiner* — Seung C Sohn
(74) *Attorney, Agent, or Firm* — Fish & Richardson P.C.

(57) ABSTRACT

A lighting device for a vehicle, the lighting device including: a lens; a light source device configured to emit light; a first reflection unit configured to reflect light emitted from the light source device toward a second side of the lens; a reflective phosphor configured to (i) convert a wavelength of light reflected by the first reflection unit and (ii) reflect light which wavelength is converted toward the lens; a second reflection unit configured to reflect a portion of light that is reflected by the reflective phosphor toward the second side of the lens; a sensing unit configured to sense light reflected by the second reflection unit; and a controller configured to control the light source device based on sensing information sensed by the sensing unit, is disclosed.

20 Claims, 3 Drawing Sheets

LIGHTING DEVICE FOR VEHICLE

CROSS-REFERENCE TO RELATED APPLICATION

This application claims the priority benefit of Korean Patent Application No. 10-2016-0074107, filed on Jun. 14, 2016 in the Korean Intellectual Property Office, the content of which is incorporated by reference herein in its entirety.

TECHNICAL FIELD

The present application generally relates to a lighting device for a vehicle.

BACKGROUND

A lighting device, such as a lamp, is installed in a vehicle so as to assist a driver to secure a field of vision by increasing surrounding illumination intensity or notify a current driving state of the vehicle to the outside.

The lighting device installed in the vehicle (hereinafter, referred to as a lighting device for a vehicle) may include a head lamp which emits light toward the front of the vehicle, and a rear lamp which indicates the direction of travel of the vehicle or notifies the operation or non-operation of a brake.

The lighting device for a vehicle may form a low beam or a high beam to ensure a driver's field of vision during night driving. Recently, the use of light-emitting diodes (LEDs) having high power efficiency and a long lifespan tends to increase.

Meanwhile, a laser diode with an irradiation distance longer than that of an LED can be used as a light source of the lighting device for a vehicle.

SUMMARY

In general, one innovative aspect of the subject matter described in this specification can be implemented in a lighting device for a vehicle, the lighting device comprising: a lens; a light source device that is configured to emit light; a first reflection unit that is located at a first side of the lens and that is configured to reflect light emitted from the light source device toward a second side of the lens; a reflective phosphor that is located at the second side of the lens and that is configured to (i) convert a wavelength of light reflected by the first reflection unit and (ii) reflect light which wavelength is converted toward the lens; a second reflection unit that is located at the first side of the lens and that is configured to reflect a portion of light that is reflected by the reflective phosphor toward the second side of the lens; a sensing unit that is configured to sense light reflected by the second reflection unit; and a controller that is configured to control the light source device based on sensing information sensed by the sensing unit.

The foregoing and other implementations can each optionally include one or more of the following features, alone or in combination. In particular, one implementation includes all the following features in combination. The reflective phosphor is located to face a second surface of the lens and is configured to reflect light toward the second surface of the lens. The reflective phosphor is aligned with an optical axis of the lens. The first reflection unit and the second reflection unit are coupled to a first surface of the lens. The lens has a convex surface at the first side of the lens, and wherein each of the first reflection unit and the second reflection unit has an arc-shaped cross section. Each of the first reflection unit and the second reflection unit includes a concave mirror that is located on a first surface of the lens. The first reflection unit and the second reflection unit are coupled to a first surface of the lens, and wherein the first reflection unit is separately located from the second reflection unit. The first reflection unit and the second reflection unit are symmetrically located about an optical axis of the lens. A first distance from an optical axis of the lens to the first reflection unit is the same as a second distance from the optical axis of the lens to the second reflection unit. A first distance from an optical axis of the lens to the first reflection unit is different from a second distance from the optical axis of the lens to the second reflection unit. Each of the first reflection unit and the second reflection unit includes an anti-reflection coating layer on at least a portion of a first surface of the lens. Each of the first reflection unit and the second reflection unit includes a reflection sheet attached to at least a portion of a first surface of the lens. The sensing unit is located at the second side of the lens. The sensing unit is located away from an optical axis of the lens. The sensing unit is located on an optical axis of the lens. The sensing unit includes: a first filter that is configured to pass light that has a first wavelength in a first wavelength band; a first light sensor that is configured to sense light that has passed through the first filter; a second filter that is configured to block light that has the first wavelength; and a second light sensor that is configured to sense light that has passed through the second filter. The lighting device further includes: a third filter that is located at a first side of the first filter and a first side of the second filter and that is configured to sensitize light directed toward the first filter and the second filter. The controller is configured to: determine whether light that is sensed by the first light sensor satisfies a first reference value, and based on a determination that light that is sensed by the first light sensor satisfies the first reference value, stop the light source device. The controller is configured to: determine whether light that is sensed by the second light sensor satisfies a second reference value, based on a determination that light that is sensed by the second light sensor satisfies the second reference value, stop the light source device. The first wavelength band includes a wavelength band between 400 and 500 nm.

The subject matter described in this specification can be implemented in particular examples so as to realize one or more of the following advantages. A lighting device for a vehicle improves safety by minimizing emission of harmful light to an outside of the vehicle.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

Like reference numbers and designations in the various drawings indicate like elements.

DETAILED DESCRIPTION

Figure 1:
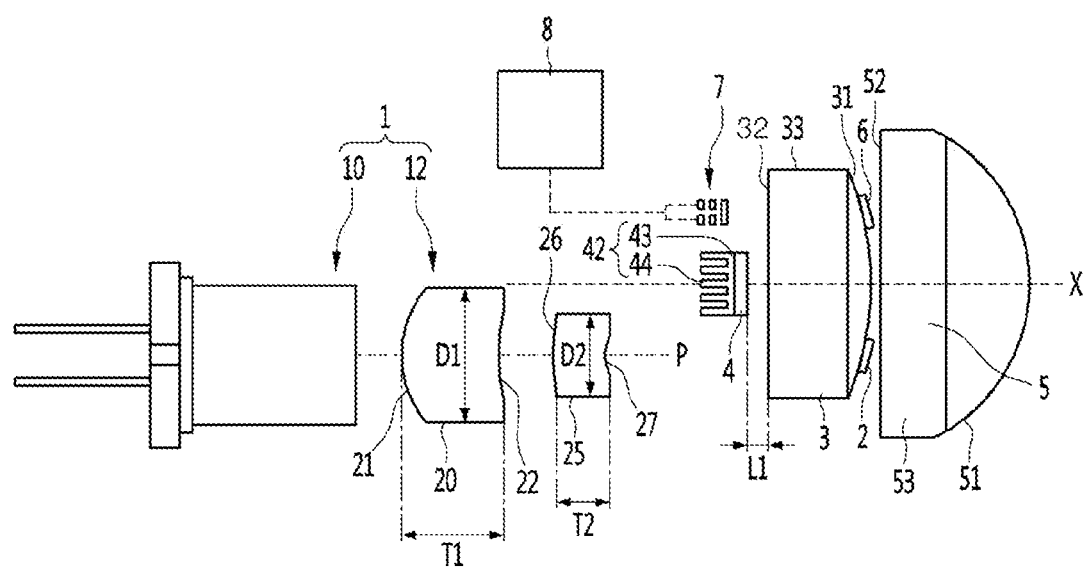
FIG. 1 is a diagram illustrating an example lighting device for a vehicle.
Figure 2:
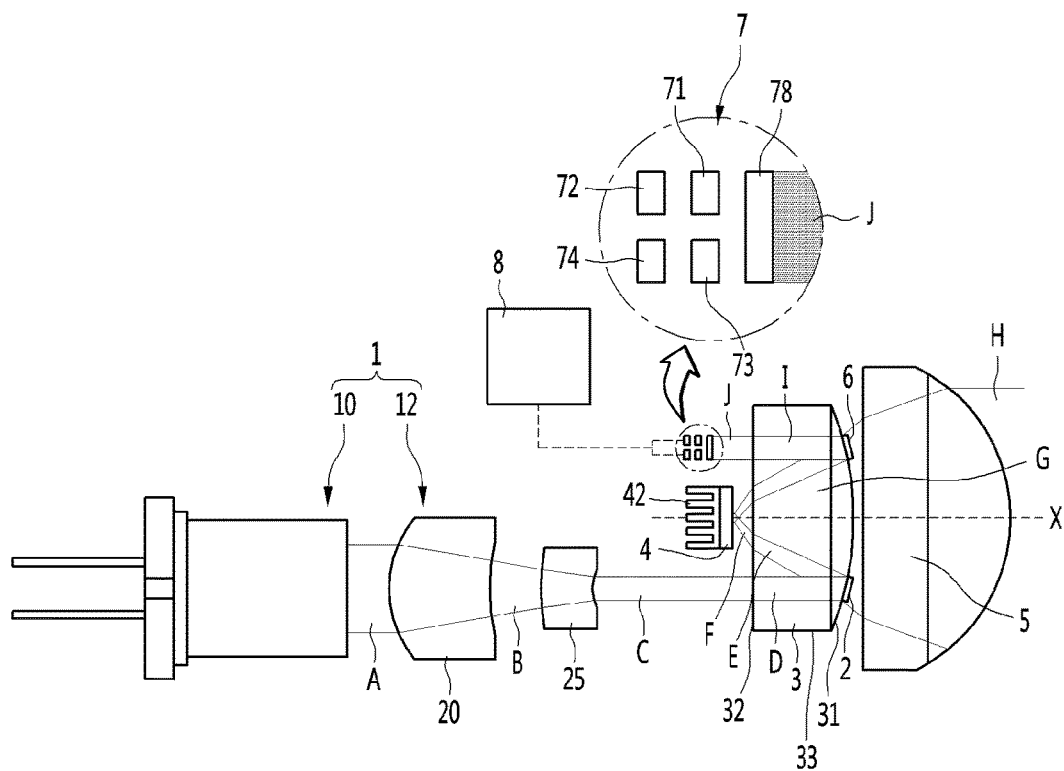
FIG. 2 is a diagram illustrating an example optical path of a lighting device for a vehicle.
Figure 3:
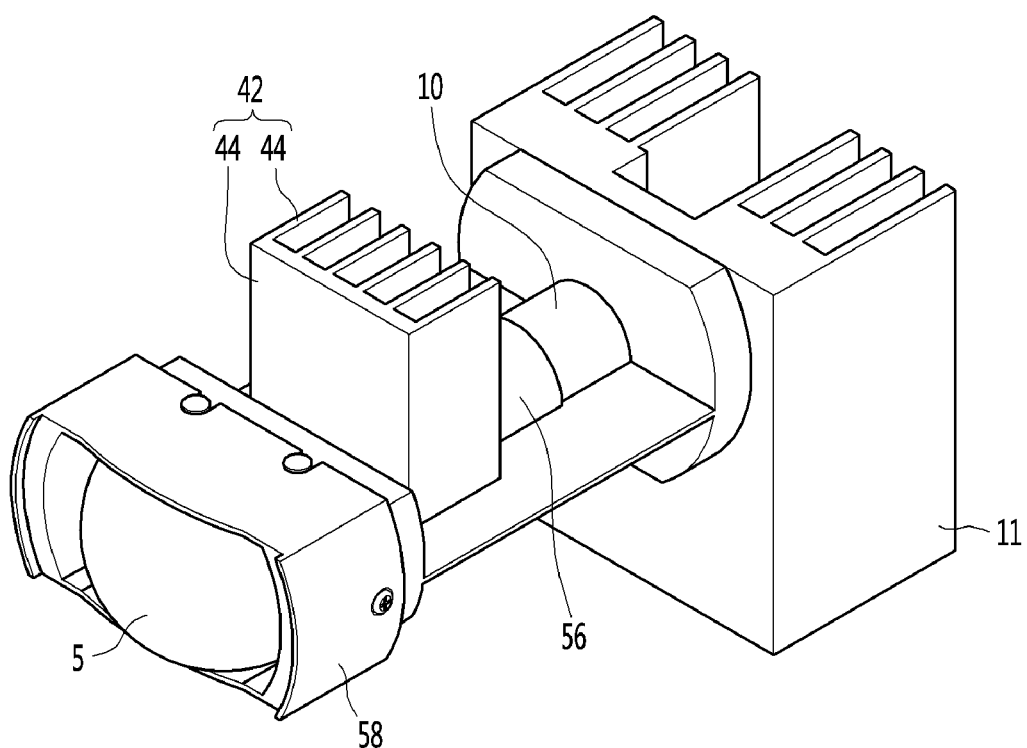
FIG. 3 is a diagram illustrating an example exterior of a lighting device of a vehicle.

FIG. 1 illustrates an example lighting device for a vehicle. FIG. 2 illustrates an example optical path of a lighting device for a vehicle. FIG. 3 illustrates an example exterior of a lighting device of a vehicle.

A lighting device for a vehicle may include a light source device 1, a first reflection unit 2, a lens 3, a reflective phosphor 4, a second reflection unit 6, a sensing unit 7, and a controller 8. The lighting device may constitute a headlamp for a vehicle and may be used as a high beam emitting device for generating a high beam or as a low beam emitting device for generating a low beam.

The light source device 1 may emit light. The lighting device 1 may emit light toward the first reflection unit 2. The light source device 1 may emit light toward the lens 3, and the light emitted toward the lens 3 may pass through the lens 3 and be then incident on the first reflection unit 2. The light source device 1 may emit light toward a rear surface 32 of the lens 3, and the light incident on the rear surface 32 of the lens 3 by the light source device 1 may pass through the lens 3 and be then incident on a rear surface of the first reflection unit 2.

The light source device 1 may include a light source 10. The light source 10 may receive electrical energy and convert the electrical energy into optical energy, and may be a light-emitting source, such as an ultra-high voltage (UHV) mercury lamp, a light-emitting diode (LED), or a laser diode (LD).

It is preferable that the light source 10 has excellent straightness and high efficiency and enables long-distance irradiation. The light source 10 is preferably a laser diode. It is preferable that the laser diode used as the light source 10 emits blue-based light having high efficiency.

As illustrated in FIG. 3, the light source 10 may be connected to a heat dissipation member 11 which dissipates heat generated by the light source 10. The heat dissipation member 11 may include a contact plate which comes into contact with the light source 10, and a heat dissipation fin which protrudes from the contact plate.

The light source device 1 may further include a reducer 12 which reduces a diameter of light emitted by the light source 10 and then emits the light toward the first reflection unit 2. In the case where the light source device 1 includes both the light source 10 and the reducer 12, the light emitted by the light source 10 may pass through the reducer 12 and be then emitted toward the first reflection unit 2. In the case where the light source device 1 includes only the light source 10 without the reducer 12, the light emitted by the light source 10 may be emitted toward the first reflection unit 2.

The reducer 12 may be disposed between the lens 3 and the light source 10. The reducer 12 may be disposed between the rear surface 32 of the lens 3 and the front surface of the light source 10, so that the reducer 12 is spaced apart from each of the lens 3 and the light source 10.

The reducer 12 may be spaced apart from the optical axis X of the lens 3. A part of the reducer 12 may be on the optical axis X of the lens 3, but the optical axis P of the reducer 12 may be spaced apart from the optical axis X of the lens 3.

The reducer 12 may be disposed behind the lens 3 and emit light in a direction parallel with the optical axis X of the lens 3. The optical axis P of the reducer 12 may be parallel to the optical axis X of the lens 3.

The reducer 12 may include: a first reducer lens 20 configured to reduce a width of light emitted by the light source 10; and a second reducer lens 25 being spaced apart from the first reducer lens 20 and configured to reduce a width of the light emitted by the first reducer lens 20.

The first reducer lens 20 includes a light entrance surface 21 and a light exit surface 22, and the second reducer lens 25 includes a light entrance surface 26, and a light exit surface 27.

The light exit surface 22 of the first reducer lens 20 and the light entrance surface 26 of the second reducer lens 25 may be spaced apart from each other. The light exit surface 22 of the first reducer lens 20 and the light entrance surface 26 of the second reducer lens 25 may be spaced apart from each other in a direction parallel to the optical axis X of the lens 3. The first reducer lens 20 and the second reducer lens 25 may be spaced apart from each other with air therebetween.

The first reducer lens 20 and the second reducer lens 25 may be spaced apart from each other in the front-rear direction. The light exit surface 22 of the first reducer lens 20 and the light entrance surface 26 of the second reducer lens 25 may be spaced apart from each other in the font-rear direction.

The first reducer lens 20 may be disposed between the light source 10 and the second reducer lens 25, and the second reducer lens 25 may be disposed between the first reducer lens 20 and the lens 3.

The light entrance surface 21 of the first reducer lens 20 may face the light source 10.

The optical axis P of the first reducer lens 20 may coincide with the optical axis of the second reducer lens 25.

The light exit surface 27 of the second reducer lens 25 may face the rear surface 32 of the lens 3. It is preferable that the light exit surface 27 of the second reducer lens 25 does not face a heat dissipation member 42 or the reflective phosphor 4.

Each of the first reducer lens 20 and the second reducer lens 25 may have a convex light entrance surface on which light is to be incident. Each of the first reducer lens 20 and the second reducer lens 25 may have a concave light exit surface through which light is to be emitted.

The rear surface of the first reducer lens 20 may be the light entrance surface 21, and the light entrance surface 21 may be a curved surface that is convex toward the rear of the first reducer lens 20. Light incident from the light source 10 may be refracted from the convex light entrance surface 21, and light passing through the first reducer lens 20 may be gradually reduced in width, as illustrated in FIG. 2.

The front surface of the first reducer lens 20 may be the light exit surface 22, and the light exit surface 22 may be a curved surface that is concave toward the rear of the first reducer lens 20. The front surface of the first reducer lens 20 may be the light exit surface 22 which is concave entirely or only at the center thereof.

A part of the light exit surface 22 of the first reducer lens 20 may face the light entrance surface 26 of the second reducer lens 25.

The rear surface of the second reducer lens 25 may be the light entrance surface 26, and the light entrance surface 26 may be a curved surface that is convex toward the rear of the second reducer lens 25. Light emitted by the first reducer lens 20 and passing through the air between the first reducer lens 20 and the second reducer lens 25 may be refracted from the convex light entrance surface 26 of the second reducer lens 25, and the light passing through the second reducer lens 25 may be gradually reduced in width.

The front surface of the second reducer lens 25 may be the light exit surface 27, and the light exit surface 27 may be a curved surface that is concave toward the rear of the second reducer lens 25. The front surface of the second reducer lens 25 may be the light exit surface 27 which is convex entirely or only at the center thereof.

The entire light emitting surface 27 of the second reducer lens 25 may face the rear surface 32 of the lens 3.

A diameter D2 of the second reducer lens 25 may be smaller than a diameter D1 of the first reducer lens 20. A thickness T2 of the second reducer lens 25 may be thinner than a thickness T1 of the first reducer lens 20. As light is reduced in the first reducer lens 20, the second reducer lens 25 may be smaller than the first reducer lens 20 so as to enhance utilization of ambient space.

A curvature of the light entrance surface 21 of the first reducer lens 20 may be equal to or different from a curvature of the light entrance surface 26 of the second reducer lens 25.

A degree of reduction in width of light passing through the first reducer lens 20 may be greatly affected by a curvature of the light entrance surface 21 of the first reducer lens 20. If the light entrance surface 21 of the first reducer lens 20 has a greater curvature, a degree of reduction in width of light passing through the first reducer lens 20 may be greater. That is, if the light reducer lens 20 has a greater curvature, it is possible to further reduce the size of the second reducer lens 25, the first reflection unit 2, and the lens 3, respectively.

Light of which width is first reduced by the first reducer lens 20 may be incident on the light entrance lens 26 of the second reducer lens 25. It is preferable that the light entrance surface 26 of the second reducer lens 25 is configured not to reduce the width of the light excessively.

In the case where a curvature of the light entrance surface 21 of the first reducer lens 20 is different from a curvature of the light entrance surface 26 of the second reducer lens 25, it is preferable that the curvature of the light entrance surface 21 of the first reducer lens 20 is greater than the curvature of the light entrance surface 26 of the second reducer lens 25.

A curvature of the light exit surface 22 of the first reducer lens 20 may be equal to or different from a curvature of the light exit surface 27 of the second reducer lens 25.

A width of the light emitted by the first reducer lens 20 may be varied according to the curvature of the light exit surface 22 of the first reducer lens 20.

The light exit surface 22 of the first reducer lens 20 may have a curvature where light passing through the light exit surface 22 is emitted in a direction parallel to the optical axis X of the lens 3. The light exit surface 22 of the first reducer lens 20 may have a curvature where a width of light passing through the light exit surface 22 is reduced between the light exit surface 22 and the light exit surface 26.

Light incident on the first reflection unit 2 may have a different width according to a curvature of the light exit surface 27 of the second reducer lens 25. It is preferable that the light exit surface 27 of the second reducer lens 25 is in a shape which allows light passing through the light exit surface 27 to be incident on the first reflection unit 2 in a direction parallel to the optical axis X of the lens 3.

In the case where a curvature of the light exit surface 22 of the first reducer lens 20 is different from a curvature of the light exit surface 27 of the second reducer lens 25, it is preferable that the curvature of the light exit surface of the second reducer lens 25 is greater than the curvature of the light exit surface 22 of the first reducer lens 20.

The first reflection unit 2 may be provided to reflect incident light toward the reflective phosphor 4. The first reflection unit 2 may reflect light, which is emitted by the light source device 1, toward the rear of the lens 3. The light reflected by the first reflection unit 2 toward the rear of the lens 3 may be incident on the reflective phosphor 4. The first reflection unit 2 will be described in detail later.

The lens 3 may be formed larger than each of the reflective phosphor 4, the first reflection unit 2, and the second reflection unit 6. The lens 3 may be disposed in front of the reflective phosphor 4 to protect the reflective phosphor 4, the first reflection unit 2, and the second reflection unit 6.

The lens 3 may have a circular or polygonal shape. The lens 3 may include a front surface 31, a rear surface 32, and a circumferential surface 33. The front surface 31 of the lens 3 may be a curved surface that is convex toward the front of the lens 3, and the rear surface 32 of the lens 3 may be a curved surface that is concave toward the front of the lens 3. The lens 3 may have the optical axis X. The lens 3 may be a condenser lens having a convex front surface 31, and the front surface of the lens 3 may be symmetrical with respect to the optical axis X of the lens 3. The optical axis X of the lens 3 may mean a rotational symmetry axis or a central axis of the lens 3. The optical axis X of the lens 3 may mean a straight line passing through the center of the front surface 31 of the lens 3 and the center of the rear surface 32 of the lens 3.

The reflective phosphor 4 may be disposed behind the lens 3, and a wavelength of light reflected by the first reflection unit 2 may be reflected by the reflection phosphor 4 toward the lens 3.

Since the reflective phosphor 4 may generate heat during the wavelength conversion of the light, it is preferable that the reflective phosphor 4 is spaced apart from the lens 3. The reflective phosphor 4 may be disposed behind the lens 3 and spaced apart from the lens 3.

The reflective phosphor 4 may be disposed to face the rear surface 32 of the lens 3, and may reflect light toward the rear surface 32 of the lens 3. The reflective phosphor 4 may be disposed on the optical axis X of the lens 3 and spaced apart from the rear surface 32 of the lens 3. The front surface of the reflective phosphor 4 may be parallel to the rear surface 32 of the lens 3.

The reflective phosphor 4 may be disposed eccentric to the optical axis X of the lens 3. However, in this case, the efficiency is low because a region of the lens 3 through which the light reflected by the reflective phosphor 4 passes is smaller than in the case where the reflective phosphor 4 is disposed on the optical axis X of the lens 3.

In addition, if the reflective phosphor 4 is disposed eccentric to the optical axis X of the lens 3, a region of a projection lens 5 through which the light reflected by the reflective phosphor 4 passes may be asymmetrical to the rest region of the projection lens 5. In this case, it may be complicated and inexpensive to manufacture the projection lens 5. However, if the reflective phosphor 4 is disposed on the optical lens 3, the projection lens 5 may be symmetrical with respect to the optical lens X of the lens 3 and it may reduce manufacturing costs of the projection lens 5. That is, it is preferable that the reflective phosphor 4 is disposed on the optical axis X of the lens 3.

The reflection phosphor 4 may include a wavelength conversion layer disposed to face the rear surface 32 of the lens 3, and a reflection unit disposed at the rear of the wavelength conversion layer.

The wavelength conversion layer may be a wavelength conversion film and may include an opto ceramic. The wavelength conversion layer may be disposed in front of the reflection unit and convert a wavelength of light reflected by the first reflection unit 2. The wavelength conversion layer may be a wavelength conversion film that converts blue-base light, which is incident from the outside, into yellow-based light. The wavelength conversion layer may include a yellow-based opto ceramic.

The reflection unit may include a plate and a reflective coating layer coated on an outer surface of the plate. The plate may be made of a metal. The reflection unit may support the wavelength conversion layer, and light passing through the wavelength conversion layer may be reflected by the reflection unit toward the rear surface 32 of the lens 3.

When blue-based light is reflected by the first reflection unit 2 toward the reflective phosphor 4, a part of the blue-based light is reflected from the surface of the wavelength conversion layer. In this case, the blue-based light incident into the wavelength conversion layer may be excited in the wavelength conversion layer and reflected by the reflection unit toward the front of the wavelength conversion layer.

The blue-based light reflected from the surface of the wavelength conversion layer and the yellow-based light emitted toward the front of the wavelength conversion layer may be mixed together, and white-based light may be emitted toward the front of the reflective phosphor 4. The white-based light may pass through the lens 3 and be then emitted toward the front of the lens 3.

A distance L1 between the reflective phosphor 4 and the lens 3 may determine an overall width of the lighting device for a vehicle. It is preferable that the reflective phosphor 4 is disposed close to the lens 3 within a range where heat damage to the lens 3 can be minimized.

The heat dissipation member 42 for assisting heat dissipation of the reflective phosphor 4 may be disposed in the reflective phosphor 4. The heat dissipation member 42 may include: a contact plate which comes into contact with the reflective phosphor 4; and a heat dissipation fin 44 which protrudes from the contact plate 43.

The contact plate 43 may be attached to the rear surface of the reflection unit.

The lens 3 included in the lighting device for a vehicle may further include the projection lens 5. The projection lens 5 may be larger than the lens 3. The optical axis of the projection lens 5 may coincide with the optical axis X of the lens 3.

The projection lens 5 may include a front surface 51, a rear surface 52, and a circumferential surface 53. The front surface 51 of the projection lens 5 may be a curved surface that is convex toward the front of the projection lens 5. The rear surface 52 of the projection lens 5 may be a flat surface. The projection lens 5 may be symmetric with respect to the optical axis X of the lens 3.

The second reflection unit 6 may reflect a part of light, which is reflected by the reflective phosphor 4 toward the lens 3, toward the rear of the lens. The second reflection unit 6 may minimize leakage of light, which can occur when light reflected by the reflective phosphor 4 passes through a region where the second reflection unit 6 is formed. The second reflection unit 6 may be installed to reflect incident light toward a sensing unit 7. The light reflected by the second reflection unit 6 toward the sensing unit 7 may be sensed by the sensing unit 7, and safety of the lighting device for a vehicle may be determined based on sensing information, e.g., a sensing value, sensed by the sensing unit 7. The second reflection unit 6 will be described in detail later.

The sensing unit 7 may sense light that is reflected by the second reflection unit 6 toward the rear of the lens 3.

The sensing unit 7 may be disposed behind the lens 3.

The sensing unit 7 may be disposed from the optical axis X of the lens 3. It is preferable that the sensing unit 7 is disposed at a position where the sensing unit 7 does not interfere with the reflective phosphor 4. It is preferable that the sensing unit 7 is disposed on an axis parallel to the optical axis of the lens 3.

Of course, the sensing unit 7 may be disposed on the optical axis X of the lens 3. The second reflection unit 6 mat reflect light obliquely toward the rear of the reflective phosphor 4, but not in a direction parallel to the optical axis X of the lens 3. The sensing unit 7 may be behind the reflective phosphor 4 and disposed on the optical axis X of the lens 3. In addition, in the case where the lighting device for a vehicle further includes a reflection member that reflects light, which is reflected by the second reflection unit 6 toward the rear of the lens 3, toward the sensing unit 7, the sensing unit 7 may be disposed on the optical axis of the lens 3. For example, the second reflection unit 6 may reflect light, which is reflected by the reflective phosphor 4, toward the rear of the lens 3 in a direction parallel to the optical axis X of the lens 3. Then, the reflection member may reflect the light, which is reflected by the second reflection unit 6 toward the rear of the lens 3, toward the optical axis X of the lens 3. Then, the sensing unit 7 disposed on the optical axis X of the lens 3 may sense the light reflected by the reflection member.

The sensing unit 7 may include: a first filter 71 configured to pass light that has a particular wavelength in a suitable wavelength band. In some implementations, the first filter 71 passes light that has a wavelength in a wavelength band between 400 and 500 nm. In some other implementations, the first filter 71 passes light that has a different wavelength at a different wavelength band.

A first light sensor 72 which senses light passing through the first filter 71; a second filter 73 configured to block light that has the first wavelength; and a second light sensor 74 configured to senses light passing through the second filter 73. In this example, light that has a wavelength in a wavelength band between 400 and 500 nm can be blue light. In this example, the sensing unit 7 may further include a third filter 78 disposed in front of the first filter 71 and the second filter 73 to sensitize light directed toward the first filter 71 and the second filter 73.

The controller 8 may control the light source device 1 based on a sensing value of the sensing unit 7. The controller 8 may determine safety/harmfulness of the lighting device for a vehicle by comparing a sensing value of the sensing unit 7 with a reference value. The controller 8 may turn off the light source 10 based on the sensing value of the sensing unit 7.

Hereinafter, the first reflection unit 2 and the second reflection unit 6 will be described in the following.

At least one of the first reflection unit 2 and the second reflection unit 6 may be integrated with the lens 3, or may be separately spaced apart from the lens 3.

A position of the first reflection unit 2 may be determined according to a position of the reflection phosphor 4. In the case where the reflective phosphor 4 is disposed behind the lens 3, the first reflection unit 2 may be disposed behind the lens 3 and spaced apart behind the lens 3, may be disposed on the rear surface of the lens 3, may be disposed on the front surface of the lens 3, or may be disposed in front of the lens 3 and spaced apart from the lens 3.

When the first reflection unit 2 is disposed behind the lens 3 and spaced apart from the lens 3, light emitted by the light source device 1 may be reflected toward a space between the reflective phosphor 4 and the lens 3.

When the first reflection unit 2 is provided on the rear surface of the lens 3 and integrated with the lens 3, light emitted by the lighting device 1 may be reflected toward a space between the reflective phosphor 4 and the lens 32.

When the first reflection unit 2 is provided on the front surface of the lens 3 and integrated with the lens 3, light emitted by the light source device 1 and passing through then lens 3 may be reflected toward the lens 3 so that the light is reflected toward the reflective phosphor 4.

When the first reflection unit 2 is disposed in front of the lens 3 and spaced apart from the lens 3, light emitted by the lighting device 1 and then passing through the lens 3 may be reflected toward the lens 3 so that the light is reflected toward the reflective phosphor 4.

When the first reflection unit 2 is disposed in front of or behind the lens 3 and spaced apart from the lens 3, the number of components of the lighting device for a vehicle may increase and the size of the lighting device for a vehicle may increase due to a distance between the lens 3 and the first distance unit 2.

It is preferable that, the first reflection unit 2 is integrated with the rear surface 32 or the front surface 31 of the lens 3 so as to minimize the number of components of the lighting device and make the lighting device compact.

When the first reflection unit 2 is provided on the entire rear surface or the entire front surface of the lens 3, light reflected by the reflective phosphor 4 may be all reflected toward the rear of the lens 3 and cannot be emitted toward the front of the lens 3 at all.

That is, it is preferable that the first reflection unit 2 is provided on a part of the rear surface of the lens 3 or a part of the front surface of the lens 3. It is preferable that the first reflection unit 2 is so large as to cause the lens 3 to secure a sufficient light emission region. It is preferable that the first reflection unit 2 is disposed from the optical axis X of the lens 3, and it is preferable that the first reflection unit 2 is disposed between the optical lens X of the lens 3 and the circumferential surface 33 of the lens 3.

The first reflection unit 2 may be provided on a part of the rear surface of the lens 3 or a part of the front surface of the lens 3. The first reflection unit 2 may be provided to reflect light, emitted by the light source device 1, toward the reflective phosphor 4.

The first reflection unit 2 may reflect incident light toward the rear of the lens 3.

It is preferable that the position of the first reflection unit 2 is determined in consideration of a distance between the reflective phosphor 4 and the lens 3.

Since the reflective phosphor 4 is preferably disposed close to the rear surface 32 of the lens 3, it is preferable that the first reflection unit 2 is provided on the front surface 31 of the lens 3.

That is, the first reflection unit 4 may be provided on a part of the front surface of the lens 3, and light emitted by the light source device 1, especially the reducer 12, may pass through the lens 3 and be then incident on the first reflection unit 4. The light reflected by the first reflection unit 4 may pass through the lens 3 and be then incident on the reflective phosphor 4, and light having a wavelength changed by the reflective phosphor 4 may pass through the lens 3 and be then emitted toward the front of the lens 3. The lens 3 may be a 3-path lens through which light passes three times, and the lighting device for a vehicle may be made compact using the 3-path lens.

The first reflection unit 2 may be formed in a part of the convex front surface 31 of the lens 3 along the convex front surface 31 of the lens 3, and may be formed to have an arc-shaped cross-section. When viewed from the front of the lens 3, the first reflection unit 2 may have a circular or polygonal shape.

The first reflection unit 2 may be a concave mirror formed on the front surface 31 of the lens 3. the first reflection unit 2 may have a convex front surface and a concave rear surface.

The first reflection unit 2 may face the projection lens 5 which will be described later, and may be disposed between the lens 3 and the projection lens 5 to thereby be protected by the lens 3 and the projection lens 5.

The position of the second reflection unit 6 may be determined by the position of the reflective phosphor 4 and the position of the sensing unit 7. In the case where the reflective phosphor 4 is disposed behind the lens 3, the second reflection unit 6 may be disposed behind the lens 3 and spaced apart from the lens 3, may be disposed on the rear surface of the lens 3, may be disposed on the front surface of the lens 3, or may be disposed in front of the lens 3 and spaced apart from the lens 3.

When the second reflection unit 6 is disposed behind the lens 3 and spaced apart from the lens 3, the second reflection unit 6 may reflect a part of light, reflected by the reflective phosphor 4, toward the vicinity of the reflective phosphor 4.

When the second reflection unit 6 is integrated with the rear surface of the lens 3, the second reflection unit 6 may reflect a part of light, reflected by the reflective phosphor 4, toward the vicinity of the reflective phosphor 4.

When the second reflection unit 6 is integrated with the front surface of the lens 3, the second reflection unit 5 may reflect part of light, reflected by the reflective phosphor 4 and then passing through the lens 3, toward the surroundings of the reflective phosphor 4.

When the second reflection unit 6 is disposed in the front of the lens 3 and spaced apart from the lens 3, the second reflection unit 6 may reflect a part of light, reflected by the reflective phosphor 4 and then passing through the lens 3, toward the vicinity of the reflective phosphor 4.

When the second reflection unit 6 is disposed behind or in front of the lens 3 and spaced apart from the lens 3, the number of components of the lighting device for a vehicle may increase and the size of the lighting device for a vehicle may increase due to a distance between the lens 3 and the second reflection unit 6.

It is preferable that the second reflection unit 6 is integrated with the rear surface 32 or the front surface 31 of the lens 3 in order to minimize the number of components of the lighting device for a vehicle and make the lighting device compact.

The second reflection unit 6 may be spaced apart from the first reflection unit 2. It is preferable that the second reflection unit 6 is so large as to cause the lens 3 to secure a sufficient light emission region. It is preferable that the second reflection unit 6 is disposed from the optical axis X of the lens 3, and it is preferable that the second reflection unit 6 is disposed between the optical axis X of the lens 3 and the circumferential surface 33 of the lens 3.

The second reflection unit 6 may be provided on a part of the rear surface of the lens 3 or a part of the front surface of the lens 3. The second reflection unit 6 may reflect a part of light, reflected by the reflective phosphor 4, toward the rear of the lens 3.

The position of the second reflection unit 6 may be determined in consideration of a distance between the reflective phosphor 4 and the lens 3. Since the reflective phosphor 4 is preferably disposed close to the rear surface 32 of the lens 3, it is preferable that the second reflection unit 6 is disposed on the front surface 31 of the lens 32.

That is, the second reflection unit 6 may be disposed on the front surface of the lens 3 and spaced apart from the first reflection unit 2; a part of light reflected by the reflective phosphor 4 may pass through the lens 3 and be then incident on the second reflection unit 6; and the light reflected by the second reflection unit 6 toward the lens 3 may pass through the lens 3 and be then emitted toward the rear of the lens 3. That is, a part of light reflected by the reflective phosphor 4 may pass through the lens 3 twice and be then emitted toward the sensing unit 7, and the lighting device for a vehicle may be made compact due to this structure.

The second reflection unit 6 may be formed in a part of the convex front surface 31 of the lens 3 along the convex front surface 31, and may be formed to have an arc-shaped cross-section. When viewed from the front of the lens 3, the second reflection unit 6 may have a circular or polygonal shape.

The second reflection unit 6 may be a concave mirror formed on the front surface 31 of the lens 3. The second reflection unit 6 may have a convex front surface and a concave rear surface.

The front surface of the second reflection unit 6 may face the projection lens 5 which will be described later, and may be disposed between the lens 3 and the projection lens 5 to be protected by the lens 3 and the projection lens 5.

The first reflection unit 2 and the second reflection unit 6 may be symmetrical to each other with respect to the optical axis X of the lens 3.

The first reflection unit 2 and the second reflection unit 6 may be disposed on the front surface 31 of the lens to be symmetrical to each other with a 180° phase difference. In the case where the first reflection unit 2 is formed in the left region of the front surface 31 of the lens, the second reflection unit 6 may be formed in the right region of the front surface 31 of the lens 3. In the case where the first reflection unit 2 is formed in the upper region of the front surface 31 of the lens 3, the second reflection unit 6 may be formed in the lower region of the front surface 31 of the lens 3.

The first reflection unit 2 and the second reflection unit 6 may be disposed at the same distance from the optical axis X of the lens 3, or may be disposed at different distances from the optical axis X of the lens 3.

In the case where the first reflection unit 2 and the second reflection unit 6 are disposed at the same distance from the optical axis X of the lens, any one of these reflection units may function as the first reflection unit 2 and the other one may function as the second reflection unit 6. In this case, it is not necessary to distinguish the two reflection units from each other for installation or operation of the lens 3, and thus, operator convenience may improve.

A first distance between the first reflection unit 2 and the optical axis X of the lens 3 may be shorter or longer than a second distance between the second reflection unit 6 and the optical axis X of the lens 3. In this case, the light source device 1 and the sensing unit 7 are not necessarily symmetrical to each other with respect to the optical axis X of the lens 3, and instead, each of the light source device 1 and the sensing unit 7 may be installed at a position that enhances efficiency of functions thereof.

Each of the first reflection unit 2 and the second reflection unit 6 may be an anti-reflection coating layer which is coated on the front surface 31 of the lens 3, except for the optical axis X of the lens, or may be a reflection sheet which is attached to the front surface 31 of the lens 3, except for the optical axis X of the lens 3.

In some implementations, the lighting device for a vehicle may further include a light reducer supporter 56 (see FIG. 3) which supports the light reducer 12. The light reducer supporter 56 may be formed to surround the light reducer 12. The light reducer supporter 56 may be elongated in a direction parallel to the optical axis X of the lens 3, and an optical path along which light passes through may be formed in the light reducer supporter 56.

In addition, the lighting device for a vehicle may further include a lens holder 58 which supports the lens 3 and the projection lens 5.

Hereinafter, the operation of the lighting device for a vehicle will be described. The following description is about an example in which the light source 10 emits blue-based light and the reflective phosphor 4 converts a wavelength of the blue-based light to generate a yellow-based light.

First of all, when the light source 10 is turned on, the light source 10 may emit blue-based light A, and the blue-based light A emitted by the light source 10 may be incident on the light reducer 12 in a direction parallel to the optical axis X of the lens 3.

The light A emitted by the light source 10 in a direction parallel to the optical axis X of the lens 3 may be incident on the light entrance surface 21 of the first reducer lens 20 and refracted from the light entrance surface 21 of the first reducer lens 20 and therefore reduced in width.

The light refracted by the first reducer lens 20 may pass through the first reducer lens 20 and be then emitted toward the light exit surface 22 of the first reducer lens 20.

Light B emitted toward the light exit surface 22 of the first reducer lens 20 may be incident on the light entrance surface 26 of the second reducer lens 25 in a direction parallel to the optical axis X of the lens 3, or may be reduced in width between the light exit surface 22 of the first reducer lens 20 and the light entrance surface 26 of the second reducer lens 25 and then incident on the light entrance surface 26 of the second reducer lens 25.

The light incident on the light entrance surface 26 of the second reducer lens 25 may pass through the second reducer lens 25 and may be emitted through the light exit surface 27 of the second reducer lens 25 in a direction parallel to the optical axis X of the lens 3.

The light A emitted by the light source 10 may be reduced in width by the first reducer lens 20 and the second reducer lens 25, and light C having a reduced width may be incident on the rear surface 32 of the lens 3 in a direction parallel to the optical axis X of the lens 3.

Light D incident on the rear surface 32 of the lens 3 may pass through the rear of the first reflection unit 2 of the lens 3 and be then incident on the rear surface of the first reflection unit 2. Light E reflected by the first reflection unit 2 may be reflected by the first reflection unit 2 in a direction toward the optical axis X of the lens 3, and then refracted from the rear surface 32 of the lens 3. Light F refracted from the rear surface of the lens 3 may be incident on the reflective phosphor 4. A wavelength of the light incident on the reflective phosphor 4 may be changed by the reflective phosphor 4, and white-based light F may be reflected by the reflective phosphor 4 toward the rear surface 32 of the lens 3 and then pass through the lens 3. Such light G may pass through the front surface 31 of the lens 3 and be then incident on the projection lens 5 through the rear surface 52 of the projection lens 5 and then refracted from the front surface 51 of the projection lens 5. Such light H may be emitted toward the front of the vehicle.

In some implementations, a part of light reflected by the reflective phosphor 4 toward the lens 3 may be incident on the second reflection unit 6. The light incident on the second reflection unit 6 by the reflective phosphor 4 may be reflected by the second reflection unit 6 toward the rear of the lens 3. Light I reflected by the second reflection unit 6 toward the rear of the lens 3 may pass through the rear surface 32 of the lens 3, and light J reflected by the second reflection unit 6 and passing through the rear surface of the lens 3 may be emitted toward the rear of the lens 3.

The light J reflected by the second reflection unit 6 and passing through the rear surface of the lens 3 may be sensitized when passing through the third filter 78, and the light passing through the third filter 78 may be incident on the first filter 71 and the third filter 78.

The light that has the first wavelength band may pass through the first filter 71 and may be blocked by the second filter 72.

The first light sensor 72 may sense light passing through the first filter 71 and output a sensing value to the controller 8, and the second light sensor 74 may sense light passing through the second filter 73 and output a sensing value to the controller 8.

When light exceeding a reference value is sensed by the first light sensor 72, the controller 8 may turn off the light source device 1. When light equal to or less than the reference value or no light is sensed by the second light sensor 74, the controller 8 may turn off the light source device 1.

The case where light exceeding the reference value is sensed by the first light sensor 72 may mean that the reflective phosphor 4 does not convert blue-based light into white-based light or that such conversion is insignificant. In this case, blue-based light exceeding the safe range may be emitted, so the light source device 1, especially the light source 10, may be turned off not to emit the blue-based light toward the front of the vehicle.

In addition, the case where light equal to or less than the reference value or no light is sensed by the second light sensor 74 may mean that the reflective phosphor 4 is able to function properly or that the second reflection unit 6 is damaged. In this case, it is hard to properly perform light conversion by the reflection phosphor 4 or perform a safety function using the second reflection unit 6, the sensing unit 7, and the controller 8. Thus, the light source device 1, especially the light source 10, may be turned off.

The implementations and examples described above are to be considered in all respects as illustrative and not restrictive.

What is claimed is:

1. A lighting device for a vehicle, the lighting device comprising:
    a lens;
    a light source device that is configured to emit light;
    a first reflection unit that is located at a first side of the lens and that is configured to reflect light emitted from the light source device toward a second side of the lens;
    a reflective phosphor that is located at the second side of the lens and that is configured to (i) convert a wavelength of light reflected by the first reflection unit and (ii) reflect light which wavelength is converted toward the lens;
    a second reflection unit that is located at the first side of the lens and that is configured to reflect a portion of light that is reflected by the reflective phosphor toward the second side of the lens;
    a sensing unit that is configured to sense light reflected by the second reflection unit; and
    a controller that is configured to control the light source device based on sensing information sensed by the sensing unit.

2. The lighting device of claim 1, wherein the reflective phosphor is located to face a second surface of the lens and is configured to reflect light toward the second surface of the lens.

3. The lighting device of claim 1, wherein the reflective phosphor is aligned with an optical axis of the lens.

4. The lighting device of claim 1, wherein the first reflection unit and the second reflection unit are coupled to a first surface of the lens.

5. The lighting device of claim 1, wherein the lens has a convex surface at the first side of the lens, and
    wherein each of the first reflection unit and the second reflection unit has an arc-shaped cross section.

6. The lighting device of claim 1, wherein each of the first reflection unit and the second reflection unit includes a concave mirror that is located on a first surface of the lens.

7. The lighting device of claim 1, wherein the first reflection unit and the second reflection unit are coupled to a first surface of the lens, and
    wherein the first reflection unit is separately located from the second reflection unit.

8. The lighting device of claim 1, wherein the first reflection unit and the second reflection unit are symmetrically located about an optical axis of the lens.

9. The lighting device of claim 1, wherein a first distance from an optical axis of the lens to the first reflection unit is the same as a second distance from the optical axis of the lens to the second reflection unit.

10. The lighting device of claim 1, wherein a first distance from an optical axis of the lens to the first reflection unit is different from a second distance from the optical axis of the lens to the second reflection unit.

11. The lighting device of claim 1, wherein each of the first reflection unit and the second reflection unit includes an anti-reflection coating layer on at least a portion of a first surface of the lens.

12. The lighting device of claim 1, wherein each of the first reflection unit and the second reflection unit includes a reflection sheet attached to at least a portion of a first surface of the lens.

13. The lighting device of claim 1, wherein the sensing unit is located at the second side of the lens.

14. The lighting device of claim 1, wherein the sensing unit is located away from an optical axis of the lens.

15. The lighting device of claim 1, wherein the sensing unit is located on an optical axis of the lens.

16. The lighting device of claim 1, wherein the sensing unit includes:
    a first filter that is configured to pass light that has a first wavelength in a first wavelength band;
    a first light sensor that is configured to sense light that has passed through the first filter;
    a second filter that is configured to block light that has the first wavelength; and
    a second light sensor that is configured to sense light that has passed through the second filter.

17. The lighting device of claim 16, further comprising:
a third filter that is located at a first side of the first filter and a first side of the second filter and that is configured to sensitize light directed toward the first filter and the second filter.

18. The lighting device of claim 16, wherein the controller is configured to:
determine whether light that is sensed by the first light sensor satisfies a first reference value, and
based on a determination that light that is sensed by the first light sensor satisfies the first reference value, stop the light source device.

19. The lighting device of claim 16, wherein the controller is configured to:
determine whether light that is sensed by the second light sensor satisfies a second reference value,
based on a determination that light that is sensed by the second light sensor satisfies the second reference value, stop the light source device.

20. The lighting device of claim 16, wherein the first wavelength band includes a wavelength band between 400 and 500 nm.

* * * * *